United States Patent
Hirose

(10) Patent No.: US 9,249,298 B2
(45) Date of Patent: Feb. 2, 2016

(54) POLYURETHANE RESIN COMPOSITION AND HOLLOW FIBER MEMBRANE MODULE PRODUCED USING SAME

(75) Inventor: Masaharu Hirose, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 0 days.

(21) Appl. No.: 14/128,677

(22) PCT Filed: May 25, 2012

(86) PCT No.: PCT/JP2012/063425
§ 371 (c)(1),
(2), (4) Date: Dec. 23, 2013

(87) PCT Pub. No.: WO2012/176577
PCT Pub. Date: Dec. 27, 2012

(65) Prior Publication Data
US 2014/0128554 A1 May 8, 2014

(30) Foreign Application Priority Data

Jun. 23, 2011 (JP) .................................. 2011-139592

(51) Int. Cl.
| | | |
|---|---|---|
| *C08G 18/10* | (2006.01) | |
| *C08L 75/04* | (2006.01) | |
| *B01D 63/00* | (2006.01) | |
| *B01D 63/02* | (2006.01) | |
| *C08G 18/64* | (2006.01) | |
| *B01D 65/08* | (2006.01) | |
| *B01D 69/08* | (2006.01) | |
| *B01D 71/54* | (2006.01) | |
| *C08G 18/48* | (2006.01) | |
| *C08G 18/66* | (2006.01) | |
| *C08G 18/80* | (2006.01) | |

(52) U.S. Cl.
CPC ................. *C08L 75/04* (2013.01); *B01D 65/08* (2013.01); *B01D 69/08* (2013.01); *B01D 71/54* (2013.01); *C08G 18/4829* (2013.01); *C08G 18/6692* (2013.01); *C08G 18/8051* (2013.01); *B01D 2321/16* (2013.01)

(58) Field of Classification Search
CPC ........ B01D 65/08; B01D 69/08; B01D 71/54; B01D 2321/16; C08G 18/4829; C08G 18/6692; C08G 18/8051
USPC .......................................... 525/458; 442/338
See application file for complete search history.

(56) References Cited

U.S. PATENT DOCUMENTS

| 4,272,377 | A | | 6/1981 | Gerlach et al. |
|---|---|---|---|---|
| 4,359,359 | A | | 11/1982 | Gerlach et al. |
| 5,306,798 | A | * | 4/1994 | Horn et al. ....................... 528/58 |
| 2010/0247895 | A1 | * | 9/2010 | Uemura .................... B32B 7/12 |
| | | | | 428/317.7 |

FOREIGN PATENT DOCUMENTS

| CN | 101921383 | | 12/2010 |
|---|---|---|---|
| JP | 54-132698 | | 10/1979 |
| JP | 60-58156 | | 4/1985 |
| JP | 60-147426 | | 8/1985 |
| JP | 60147426 | A * | 8/1985 |
| JP | 62-227915 | | 10/1987 |
| JP | 62227915 | A * | 10/1987 |
| JP | 63-246175 | | 10/1988 |
| JP | 63246175 | A * | 10/1988 |
| JP | 2005-89491 | | 4/2005 |
| JP | 2011-16993 | | 1/2011 |
| WO | 2006/035632 | | 4/2006 |

OTHER PUBLICATIONS

English Translation of JPS60-147426 (JP1985-147426).*
English Translation of JPS62-227915 (JP1987-227915).*
English Translation of JPS63-246175 (JP1988-246175).*
International Search Report for PCT/JP2012/063425, dated Sep. 4, 2012.
Chinese Office Action dated Sep. 11, 2014 for corresponding Chinese Patent Application No. 201280030910.3, and English translation thereof.
Japanese Notification of Reasons for Refusal dated Oct. 27, 2014 for corresponding Japanese Patent Application No. 2011-139592, and English translation thereof.

* cited by examiner

*Primary Examiner* — Randy Gulakowski
*Assistant Examiner* — Christopher M Rodd
(74) *Attorney, Agent, or Firm* — Wenderoth, Lind & Ponack, L.L.P.

(57) ABSTRACT

The polyurethane resin composition comprises a main agent (I) which comprises an urethane prepolymer (A) with an isocyanate group terminal and a hardener (II) which comprises an urethane prepolymer (B) with a hydroxyl group terminal, wherein the urethane prepolymer (B) with the hydroxyl group is a product of reaction between a polyol ingredient (a) comprising a castor oil-based polyol (a1) and a polyisocyanate (b) can inhibit the hollow fiber membranes from clogging, regardless of the kind thereof, when the composition is used as a binder for hollow fiber membranes.

3 Claims, No Drawings

POLYURETHANE RESIN COMPOSITION AND HOLLOW FIBER MEMBRANE MODULE PRODUCED USING SAME

TECHNICAL FIELD

The present invention relates to a polyurethane resin composition. More particularly, the present invention relates to a polyurethane resin composition for use as a binder for hollow fiber membranes.

BACKGROUND ART

Polyurethane resins are used as binders for hollow fiber membranes. For example, patent document 1 proposes a polyurethane resin composition for use as a binder for hollow fiber membranes, wherein a polyol ingredient which includes a polyol obtained by modifying castor oil or a castor oil/fatty acid with a trimethylolalkane and an isocyanate ingredient are used. However, since there are many kinds of hollow fiber membranes which differ in pore diameter depending on intended uses, conventional resin compositions have s a problem that there are cases where some kinds of hollow fiber membranes are clogged.

PRIOR-ART DOCUMENT

Patent Document

Patent Document 1: JP-A-2005-89491

SUMMARY OF THE INVENTION

Problem to be Solved by the Invention

The present invention has been achieved in order to overcome the conventional problem and an object is to provide a polyurethane resin composition which can inhibit the hollow fiber membranes from clogging, regardless of the kind thereof, when the composition is used as a binder for hollow fiber membranes and a hollow fiber membrane module produced using the composition.

Means for Solving Problems

The present invention relates to a polyurethane resin composition which comprises a main agent (I) which comprises a urethane prepolymer (A) with an isocyanate group terminal and a hardener (II) which comprises a urethane prepolymer (B) with a hydroxyl group terminal, wherein the urethane prepolymer (B) with the hydroxyl group terminal is a product of reaction between a polyol ingredient (a) comprising a castor oil-based polyol (a1) and a polyisocyanate (b).

Additionally, it is preferable that the polyol ingredient (a) further comprises a polyether polyol (a2) having 4 to 8 hydroxyl groups.

Additionally, it is preferable that the polyurethane resin composition is a composition for binding hollow fibers.

The present invention relates to a hollow fiber membrane module wherein the above polyurethane resin composition is used.

Effect of the Invention

The polyurethane resin composition of the present invention can inhibit the clogging of the hollow fiber membranes regardless of the kind thereof, when the composition is used as a binder for hollow fiber membranes.

Modes for Carrying Out the Invention

The polyurethane resin composition of the present invention includes a main agent (I) which comprises an urethane prepolymer (A) with an isocyanate group terminal and a hardener (II) which includes an urethane prepolymer (B) with a hydroxyl group terminal.

The main agent (I) comprises the urethane prepolymer (A) with the isocyanate group terminal, and the urethane prepolymer (A) with the isocyanate group terminal is a product of reaction between a polyisocyanate and a polyol ingredient.

Examples of the polyisocyanate to be used for producing the urethane prepolymer (A) with the isocyanate group terminal include aromatic polyisocyanates such as tolylene diisocyanate, diphenylmethane diisocyanate, polymethylene polyphenyl polyisocyanate (polymeric MDI), xylylene diisocyanate, and $\alpha,\alpha,\alpha,\alpha$-tetramethylxylylene diisocyanate, aliphatic polyisocyanates such as tetramethylene diisocyanate, hexamethylene diisocyanate, 2,2,4-trimethylhexamethylene diisocyanate, and 2,4,4-trimethylhexamethylene diisocyanate, alicyclic polyisocyanates such as isophorone diisocyanate, hydrogenated xylylene diisocyanate, and 4,4'-dicyclohexylmethane diisocyanate, and compounds obtained by partly modifying these polyisocyanates by a carbodiimide modification, biuret modification, allophanate modification, or isocyanurate modification. These polyisocyanates can be used alone or in combination. Preferable compounds are one or more of aromatic polyisocyanates and compounds obtained by partly modifying these polyisocyanates by a carbodiimide modification, biuret modification, allophanate modification, or isocyanurate modification, since such polyisocyanates have high reactivity with hydroxyl groups. More preferable compounds are polymethylene polyphenyl polyisocyanate, diphenylmethane diisocyanate which has partial a carbodiimide modification, or a mixture of these, since these polyisocyanates have low crystallinity and enable the main agent (I) to have satisfactory storage stability.

Examples of the polyol ingredient to be used for producing the urethane prepolymer (A) with the isocyanate group terminal include polyether polyols, polyester polyols, polycarbonate polyols, polybutadiene polyols, polyisoprene polyols, castor oil-based polyols, and alkylenediols. Such known polyols can be used alone or in combination. From the standpoint that the amount of organic substances which dissolve away in water can be reduced, castor oil-based polyols are preferable of those, and castor oil is more preferable of these.

As the castor oil, castor oil of ordinary grade for use in the production of urethane prepolymers with an isocyanate group terminal can be used. Examples thereof include castor oil having an average hydroxyl value of, for example, about 160 mg KOH/g.

The reaction between a polyisocyanate and a polyol ingredient can be conducted by a conventionally known method. For example, by reacting a polyisocyanate which contains free NCO groups in an amount of 20-48% by mass with a polyol ingredient, a urethane prepolymer having isocyanate groups at the ends can be produced.

The NCO/OH ratio (molar ratio) of the urethane prepolymer (A) with the isocyanate group terminal in the main agent (I) is not particularly limited. However, the NCO/OH ratio thereof is preferably from 2 to 10, more preferably from 3 to 8, from the standpoint that such prepolymer has low crystallinity and excellent storage stability. Consequently, it is preferable that the proportion of the polyisocyanate to the polyol ingredient, which are to be use for producing the urethane prepolymer (A) with the isocyanate group terminal, and the content of the urethane prepolymer (A) with the isocyanate group terminal in the main agent (I) should be set so as to satisfy the NCO/OH ratio, for the same reason as shown above.

The viscosity at 25° C. of the main agent (I), which contains the ingredient described above, is not particularly limited. However, from the standpoint of ensuring an adequate pot life and sufficient flowability of the mixture thereof with the hardener, the viscosity of the main agent is preferably from 1,000 to 8,000 mPa·s. In the present invention, the viscosity of the main agent and that of the hardener, which will be described below, are given in terms of value measured at 25° C. with using a rotational viscometer in accordance with JIS Z8803.

The hardener (II) comprises the urethane prepolymer (B) with the hydroxyl group terminal, and this urethane prepolymer (B) with the hydroxyl group terminal is a product of reaction between a polyol ingredient (a) including a castor oil-based polyol (a1) and a polyisocyanate (b).

The polyol ingredient (a) includes a castor oil-based polyol (a1). The castor oil-based polyol (a1) is a polyol produced with using castor oil, a castor oil/fatty acid, hydrogenated castor oil obtained by hydrogenating castor oil, or a hydrogenated castor oil/fatty acid obtained by hydrogenating a castor oil/fatty acid. Examples of such castor oil-based polyol (a1) include castor oil, products of transesterification between castor oil and other natural fats or oils, products of reaction between castor oil and polyhydric alcohols, products of transesterification between a castor oil/fatty acid and polyhydric alcohols, hydrogenated castor oil, products of transesterification between hydrogenated castor oil and other natural fats or oils, products of reaction between hydrogenated castor oil and polyhydric alcohols, products of esterification between a hydrogenated castor oil/fatty acid and polyhydric alcohols, and polyols obtained by addition polymerization of an alkylene oxide to these polyols. These polyols can be used alone or in combination.

The average hydroxyl value of the castor oil-based polyol (a1) is not particularly limited. However, the average hydroxyl value thereof is preferably from 50-300 mg-KOH/g and more preferably from 00-200 mg-KOH/g, since such castor oil-based polyol (a1) gives a cured object having excellent strength and sufficient flowability can be retained after mixing with the hardener.

The content of the castor oil-based polyol (a1) in the polyol ingredient (a) is not particularly limited. However, the content thereof is preferably from 50 to 100% by mass, more preferably from 60 to 90% by mass, most preferably from 65 to 85% by mass, since this polyol ingredient (a) brings about excellent compatibility with the main agent and since sufficient flowability can be retained after mixing with the hardener.

The polyol ingredient (a) may further include a polyether polyol (a2) having 4 to 8 hydroxyl groups. Examples of the polyether polyol (a2) having 4 to 8 hydroxyl groups include polyether polyols obtained by adding alkylene oxides, such as ethylene oxide, propylene oxide, and butylene oxide to polyols having 4-8 hydroxyl groups, such as pentaerythritol, sorbitol, and sucrose. These polyether polyols can be used alone or in combination. Among these, the polyether polyols obtained by using propylene oxide and butylene oxide as the alkylene oxides are preferable, since such polyether polyols are excellent in water resistance. Additionally, the polyether polyols obtained by using sorbitol as the polyol is preferable, since the polyether polyols are excellent in durability and sufficient flowability can be retained after mixing with the main agent.

The average hydroxyl value of the polyether polyol (a2) having 4 to 8 hydroxyl groups is not particularly limited. However, the average hydroxyl value thereof is preferably from 300 to 800 mg KOH/g and more preferably from 400-600 mg KOH/g, from the standpoints of enhancing the hardness of the cured object and increasing durability of a module in case of use for the hollow fiber membrane module.

The content of the polyether polyol (a2) having 4 to 8 hydroxyl groups in the polyol ingredient (a) is not particularly limited. However, the content thereof is preferably from 10-40% by mass and more preferably from 15-35% by mass, from the standpoints of enhancing the hardness of the cured object and increasing durability of a module in case of use for the hollow fiber membrane module.

The polyol ingredient (a) may further contain other polyols (a3) besides the castor oil-based polyol (a1) and the polyether polyol (a2) having 4-8 hydroxyl groups. Examples of the other polyols (a3) include polyols having 2 hydroxyl groups, such as ethylene glycol, propylene glycol, diethylene glycol, dipropylene glycol, and triethylene glycol, polyols having 3 hydroxyl groups, such as glycerin and trimethylolpropane, polyols having 4 hydroxyl groups, such as pentaerythritol, polyols having 6 hydroxyl groups, such as sorbitol, polyols having 8 hydroxyl groups, such as sucrose, polyether polyols obtained by adding an alkylene oxide to the polyols having 2 or 3 hydroxyl groups, and polyether polyols such as amine polyols obtained by adding an alkylene oxide to amine compounds such as aniline, tolylenediamine, ethylenediamine, and diethylenetriamine. Polyester polyols, polybutadiene polyols, and the like are also used.

The content of the other polyols (a3) in the polyol ingredient (a) is not particularly limited. However, it is preferable to limit the content thereof to 20% by mass or less, from the standpoint that the effect of the present invention will not be impaired.

Preferable examples of the polyisocyanate (b) include the same polyisocyanates which are used for preparing the urethane prepolymer (A) with the isocyanate group terminal.

The reaction between the polyol ingredient (a) and the polyisocyanate (b) can be conducted by a conventionally known method. For example, by reacting the polyol ingredient (a) with the polyisocyanate (b) under such conditions that hydroxyl groups are present in excess, a urethane prepolymer can have hydroxyl groups at the ends.

The NCO/OH ratio (molar ratio) of the urethane prepolymer (B) with the hydroxyl group terminal in the hardener (II) is not particularly limited. However, the NCO/OH ratio thereof is preferably from 0.01 to 0.5 and more preferably from 0.05 to 0.3, since the hardener has excellent compatibility with the main agent and sufficient flowability can be obtained after mixing with the hardener. Consequently, it is preferable that the proportion of the polyol ingredient (a) to the polyisocyanate (b) and the content of the urethane prepolymer (B) with the hydroxyl group terminal in the hardener (II) should be set so as to satisfy the above NCO/OH ratio, for the same reason as shown above.

The average hydroxyl value of the hardener (II), which contains the ingredient described above, is not particularly limited. However, the average hydroxyl value thereof is preferably from 100 to 300 mg KOH/g and more preferably from 150 to 250 mg-KOH/g, since a further reduced viscosity after mixing with the main agent can be obtained and further higher hardness to the cured polyurethane resin can be imparted.

The viscosity at 25° C. of the hardener (II) is not particularly limited. However, the viscosity thereof is preferably from 4,000 to 30,000 mPa·s, since sufficient flowability can be retained after mixing with the main agent.

The mixing ratio of the main agent (I) and the hardener (II) is preferably from 0.8 to 1.3 in terms of NCO/OH ratio (molar ratio), from the standpoint that such mixture has satisfactory hardenability. More preferable NCO/OH ratio (molar ratio) is from 0.9 to 1.2.

The polyurethane resin composition of the present invention may contain a known curing catalyst according to need. As the curing catalyst, a metallic catalyst or amine-based catalyst which is in use for the production of polyurethane resins can be used. Examples of the metallic catalyst include tin catalysts such as dibutyltin dilaurate, dioctyltin dilaurate, and dibutyltin dioctoate, lead catalysts such as lead octylate, lead octenoate, and lead naphthenate, and bismuth catalysts such as bismuth octylate and bismuth neodecanoate. Examples of the amine-based catalyst include diethylenetriamine. These catalysts can be used alone or in combination.

The content of the curing catalyst in the polyurethane resin composition can be suitably regulated in accordance with the desired rate of curing. In general, however, the content thereof is from 0.0001 to 3 parts by mass per 100 parts by mass of the sum of the main agent (I) and the hardener (II).

The polyurethane resin composition of the present invention may contain an isocyanate compound in the main agent (I) or separately from the main agent (I), so long as the incorporation thereof does not decrease the effect of the present invention. Preferable examples of the isocyanate compound include the same polyisocyanates which are used for preparing the urethane prepolymer (A) with the isocyanate group terminal.

Furthermore, the polyurethane resin composition of the present invention may contain a polyol (C) in the hardener (II) or separately from the hardener (II), so long as the incorporation thereof does not decrease the effect of the present invention. Preferable examples of the polyol (C) include the polyols shown above with regard to the polyol ingredient (a).

In the polyurethane resin composition of the present invention, curing begins by mixing of the main agent (I) with the hardener (II) and further mixing of a curing catalyst according to need, and a cured polyurethane resin is generated.

The polyurethane resin composition of the present invention is especially useful as a composition for binding hollow fibers.

Examples of the hollow fibers include hollow fibers constituted of, for example, polysulfones, polyacrylonitrile, polyamides, cellulose acetate, or poly(vinylidene fluoride). Such hollow fibers are in use in various applications, for example, as a hollow fiber membrane module obtained by binding a bundle of the hollow fibers at each end with the polyurethane resin composition. The polyurethane resin composition of the present invention is useful as a binder for binding a bundle of such hollow fibers at the ends.

The present invention further relates to a hollow fiber membrane module in which a cured object formed from the polyurethane resin composition is used as the binder.

The hollow fiber membrane module of the present invention is used in the food industry, production of medicines, chemical industry, civil engineering, production of semiconductors or electronic components, and in the fields of coating materials, machinery, printing, fibers, medical science, etc. In particular, the module of the present invention is suitable as a hollow fiber membrane module for use in water purifiers, blood treatment devices, or the like.

EXAMPLES

Although the present invention will be explained below in detail by reference to Examples, the present invention should not be limited by the following Examples. In the Examples, "parts" and "%" are based on mass unless otherwise indicated.

<Evaluation Methods>
(Average Hydroxyl Value)

Measurement was carried out in accordance with JIS K1557.

(Viscosity)

A rotational viscometer (trade name B Type Viscometer BM, manufactured by Brookfield Engineering Laboratories, Inc.) was used to conduct a measurement at 25° C. in accordance with JIS Z8803.

(Pot Life)

A liquid mixture of the main agent (I) and the hardener (II) was allowed to stand at 25° C., and the period (minutes) from initiation of the mixing to the time at which the viscosity of the mixture reached 100,000 mPa·s was measured as pot life. The results thereof are shown in Table 1. Longer pot lives gives excellent operation efficiency, for example, since the operation for introducing the polyurethane resin composition into a large apparatus can be conducted in sufficient time. However, it is noted that too long pot lives are undesirable since too long a period is necessary for curing, which result in a decrease in productivity.

(Hardness of Cured Object)

A hardness meter (ASKER Type D, manufactured by Kobunshi Keiki Co., Ltd.) was used to measure Shore D hardness in accordance with JIS K6253. The results thereof are shown in Table 1.

(Evaluation with Hollow Fiber Membranes)

A hundred grams of a liquid mixture of the main agent (I) and the hardener (II) was introduced into a cylindrical case made of a polycarbonate (inner diameter, 100 mm) in which 3,000 polysulfone hollow fiber membranes had been placed, and centrifugal molding was conducted to seal the interstices among the hollow fiber membranes and the space between the hollow fiber membranes and the cylindrical case. Subsequently, this structure was allowed to stand at 25° C. for 4 days. The end of each sealed portion was cut to open the hollow fibers in order to produce a hollow fiber membrane module. Thus, two kinds of hollow fiber membrane modules were produced; i.e., a module using polysulfone hollow fiber membranes having a pore diameter of 0.2 μm and a module using polysulfone hollow fiber membranes having a pore diameter of 1 μm.

The ends of each hollow fiber membrane module obtained were observed with a loupe, and whether the hollow fiber membranes had clogged or not was evaluated as described below.

A: Clogging occurred in less than 7% of the whole membranes (i.e., in less than 210 membranes)

B: Clogging occurred in 7% or more but less than 10% of the whole membranes (i.e., in 210 or more but less than 300 membranes)

C: Clogging occurred in 10% or more of the whole membranes (i.e., in 300 or more membranes)

Furthermore, water was filled into the hollow fiber membrane modules obtained, and the modules were examined for leakage.

Preparation Example 1

Preparation of Main Agent (I)

With 29.7 parts of castor oil (average hydroxyl value, 160 mg-KOH/g; Refined Castor Oil A (trade name), manufactured by ITOH OIL CHEMICALS CO., LTD), 70.3 Parts of 4,4'-diphenylmethane diisocyanate which had been partly modified by a carbodiimide modification (free NCO content, 29.5%; Lupranate MM-103 (trade name), manufactured by BASF INOAC Polyurethanes Ltd.) was mixed and reacted to prepare a main agent (I-1) including an urethane prepolymer (A) with an isocyanate group terminal having an NCO/OH ratio (molar ratio) of 5.8. The main agent (I-1) obtained had a free NCO content of 17% and a viscosity as measured at 25° C. of 4,500 mPa·s.

Preparation Example 2

Preparation of Hardeners (II)

<Starting Materials used>
The starting materials used for preparing hardeners (II) are as follows.
Castor Oil-based Polyols (a1)
  a1-1: Castor oil (average hydroxyl value, 160 mg KOH/g; Refined Castor Oil A (trade name), manufactured by ITOH OIL CHEMICALS CO., LTD.)
  a1-2: Castor oil-based polyol (average hydroxyl value, 200 mg KOH/g; URIC H-52 (trade name), manufactured by ITOH OIL CHEMICALS CO., LTD)
Polyether Polyols having 4-8 Hydroxyl Groups (a2)
  a2-1: Polyether polyol obtained by adding propylene oxide to sorbitol (average hydroxyl value, 450 mg KOH/g)
  a2-2: Polyether polyol obtained by adding propylene oxide to sorbitol (average hydroxyl value, 550 mg KOH/g)
Other Polyols (a3)
  a3-1: Polyether polyol obtained by adding propylene oxide to glycerin (average hydroxyl value, 561 mg KOH/g)
  a3-2: Trimethylolpropane
Polyisocyanate (b)
  b-1: 4,4'-Diphenylmethane diisocyanate which had been partly modified by carbodiimide modification (free NCO content, 29.5%; Lupranate MM-103 (trade name), manufactured by BASF INOAC Polyurethanes Ltd.) cl Preparation of Hardener (II-1)

With 100 part of the castor oil, 7.1 Part of the 4,4'-diphenylmethane diisocyanate which had been partly modified by a carbodiimide modification was mixed and reacted to prepare a hardener (II-1) including the urethane prepolymer (B) with a hydroxyl group terminal having an NCO/OH ratio (molar ratio) of 0.17. The hardener (II-1) obtained had an average hydroxyl value of 123 mg KOH/g and a viscosity measured at 25° C. of 4,100 mPa·s.

Preparation of Hardeners (II-2) to (II-9)

The ingredients shown in Table 1 were mixed and reacted in the proportions shown in the Table. Thus, hardeners (II-2) to (II-9) each including the urethane prepolymer (B) with a hydroxyl group terminal were prepared. These hardeners were examined for NCO/OH ratio (molar ratio), average hydroxyl value, and viscosity (25° C.). The results thereof are shown in Table 1.

Examples 1 to 8 and Comparative Example 1

The main agent (I-1) prepared in Preparation Example 1 was mixed at 25° C. with each of the hardeners (II-1) to (II-9) prepared in Preparation Example 2, in such amounts as to result in an NCO/OH ratio (molar ratio) of 1.0, and each mixture was stirred for 2 minutes. The liquid mixtures thus obtained were evaluated for pot life and the hardness of the cured object and evaluated with respect to hollow fiber membranes. The results thereof are shown in Table 1.

TABLE 1

| | | | Example | | | | | | | Comparative Example |
|---|---|---|---|---|---|---|---|---|---|---|
| | | 1 | 2 | 3 | 4 | 5 | 6 | 7 | 8 | 1 |
| Main agent (I) | | | | | | I-1 | | | | |
| Hardener (II) | | II-1 | II-2 | II-3 | II-4 | II-5 | II-6 | II-7 | II-8 | II-9 |
| Recipe | | | | | | | | | | |
| a1-1 | | 100 | 74.6 | 74.6 | 74.6 | 74.6 | — | 70.0 | 81.4 | 74.6 |
| a1-2 | | — | — | — | — | — | 83.0 | — | — | — |
| a2-1 | | — | — | — | — | — | — | 20.0 | — | — |
| a2-2 | | — | 25.4 | 25.4 | 25.4 | 25.4 | 17.0 | — | 15.0 | 25.4 |
| a3-1 | | — | — | — | — | — | — | 10.0 | — | — |
| a3-2 | | — | — | — | — | — | — | — | 3.6 | — |
| b-1 | | 7.1 | 7.1 | 8.5 | 10.4 | 11.7 | 8.5 | 8.5 | 8.5 | — |
| Results of evaluation | | | | | | | | | | |
| NCO/OH ratio | | 0.17 | 0.11 | 0.13 | 0.16 | 0.18 | 0.13 | 0.13 | 0.13 | — |
| Average hydroxyl value (mg KOH/g) | | 123 | 215 | 209 | 199 | 191 | 209 | 209 | 209 | 259 |
| Viscosity (mPa·s, 25° C.) | | 4100 | 6300 | 8000 | 13000 | 23000 | 6000 | 8000 | 9000 | 1050 |
| Results of evaluation | | | | | | | | | | |
| Pot life (min) | | 61 | 65 | 65 | 62 | 61 | 68 | 63 | 62 | 73 |
| Hardness of cured object | | 30 | 72 | 73 | 73 | 73 | 75 | 75 | 75 | 73 |
| Evaluation of hollow fiber membrane modules | | | | | | | | | | |
| Pore diameter, 0.2 μm | Clogging | A | A | A | A | A | A | A | A | C |
| | Leakage | not occurred | not occurred | not occurred | not occurred | not occurred | not occurred | not occurred | not occurred | not occurred |

TABLE 1-continued

|  |  | Example | | | | | | | | Comparative Example |
|---|---|---|---|---|---|---|---|---|---|---|
|  |  | 1 | 2 | 3 | 4 | 5 | 6 | 7 | 8 | 1 |
| Pore diameter, 1 μm | Clogging | B | A | A | A | A | A | A | A | C |
|  | Leakage | not occurred | not occurred | not occurred | not occurred | not occurred | not occurred | not occurred | not occurred | not occurred |

As shown in Table 1, the polyurethane resin compositions (Examples 1 to 8) each containing a hardener (II) including the urethane prepolymer (B) with the hydroxyl group terminal had a pot life within a suitable range and were able to inhibit clogging of the hollow fiber membranes. In particular, the polyurethane resin compositions (Examples 2 to 8) for which a castor oil-based polyol (a1) and a polyether polyol having 4-8 hydroxyl groups (a2) had been used in combination as the polyol ingredient (a) not only gave cured objects having a high hardness but also were able to more effectively inhibit clogging even when hollow fiber membranes having a pore diameter of 1 μm were used. On the other hand, the polyurethane resin composition (Comparative Example 1) for which a mixture of a castor oil-based polyol (a1) and a polyether polyol having 4-8 hydroxyl groups (a2) had been used as the hardener (II) failed to inhibit clogging in the hollow fiber membrane modules.

INDUSTRIAL APPLICABILITY

The polyurethane resin composition of the present invention is usable as a binder for hollow fiber membranes for use in water purifiers, blood treatment devices, or the like.

The invention claimed is:

1. A polyurethane resin composition which comprises
   a main agent (I) which comprises a urethane prepolymer (A) with an isocyanate group terminal and
   a hardener (II) which comprises a urethane prepolymer (B) with a hydroxyl group terminal,
   wherein the urethane prepolymer (B) with the hydroxyl group terminal is a product of reaction between a polyol ingredient (a) and a polyisocyanate (b), and wherein the polyol ingredient (a) comprises a castor oil-based polyol (a1), present in an amount of between 50% and 74.6% by mass of the polyol ingredient (a), and a polyether polyol having 4 to 8 hydroxyl groups (a2), present in an amount of between 25.4% and 40% by mass of the polyol ingredient (a).

2. A bound group of hollow fibers, which is bound by the polyurethane resin composition according to claim 1.

3. A hollow fiber membrane module wherein the polyurethane resin composition according to claim 1 is used.

* * * * *